(No Model.)
C. H. DANA.
SHEPHERD'S CROOK.
No. 281,243. Patented July 17, 1883.
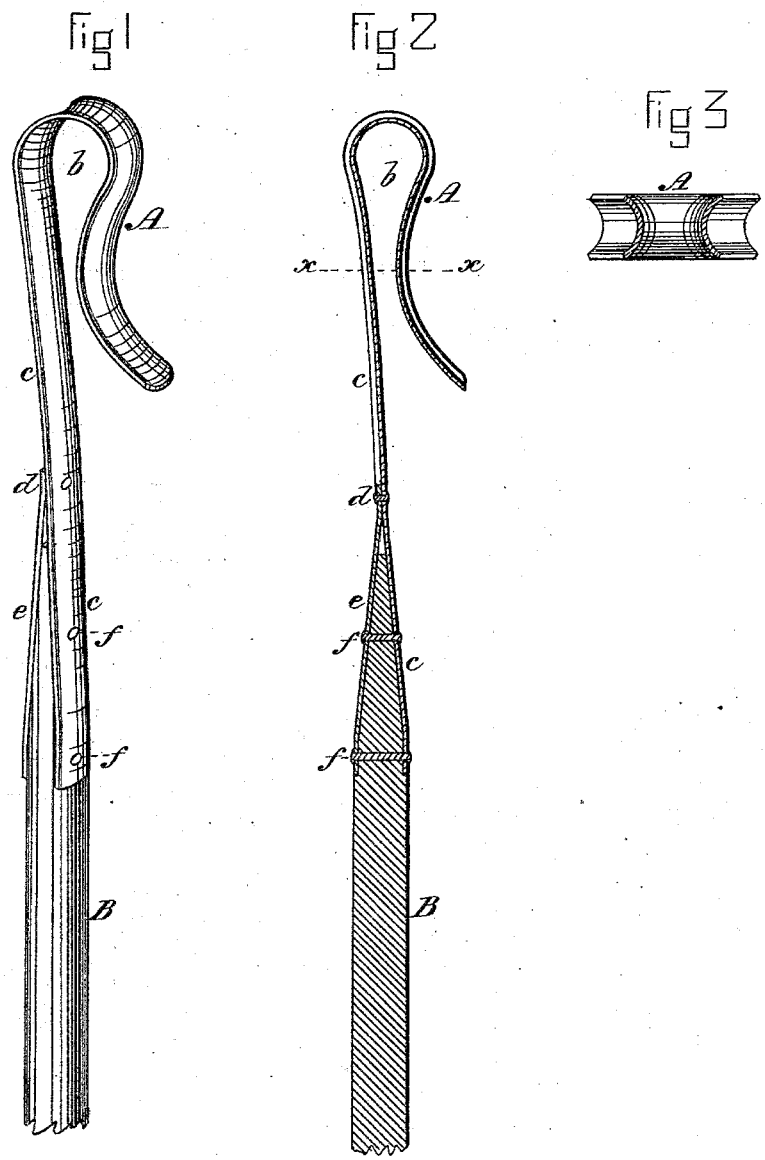
WITNESSES
W. J. Cambridge
E. J. Hanson
INVENTOR
Charles H. Dana
per F. E. Teschemacher
Atty

UNITED STATES PATENT OFFICE.

CHARLES H. DANA, OF WEST LEBANON, NEW HAMPSHIRE.

SHEPHERD'S CROOK.

SPECIFICATION forming part of Letters Patent No. 281,243, dated July 17, 1883.

Application filed March 22, 1883. (No model.)

*To all whom it may concern:*

Be it known that I, CHARLES H. DANA, a citizen of the United States, residing at West Lebanon, in the county of Grafton and State of New Hampshire, have invented certain Improvements in Shepherds' Crooks, of which the following is a full, clear, and exact description, reference being had to the accompanying drawings, making part of this specification, in which—

Figure 1 is a perspective view of a shepherd's crook constructed in accordance with my invention. Fig. 2 is a longitudinal vertical section through the center of the same. Fig. 3 is a transverse section (enlarged) on the line $x\ x$ of Fig. 2.

Shepherds' crooks, which are employed for catching sheep by the hind legs, as heretofore constructed, have been formed of solid round wire or metal securely fastened to a long wooden staff or handle. This construction is, however, objectionable, as the weight of the metallic hook at the end of the long staff renders it inconvenient to handle the implement as quickly as is desirable in the operation of catching a sheep.

My invention has for its object to overcome this difficulty; and it consists in a shepherd's crook composed of tempered spring-steel or other suitable metal of concavo-convex or V shape in cross-section, and provided at its lower end with an open V-shaped socket for attachment to the staff or handle, formed by securing to the shank of the hook, at a suitable angle, a piece of metal of the same form in cross-section as that of which the hook is composed, and having the concave sides of the two branches of the socket innermost, thus enabling it to fit, without further shaping, the rounded and tapered end of the staff, to which it is secured by rivets or screws, whereby an exceedingly cheap and strong socket or fastening device is provided.

In the said drawings, A represents the hook or crook, which is preferably made of spring-steel and is of concavo-convex or V shape in cross-section, as seen in Fig. 3, the metal being about one-half an inch in width and of a suitable thickness to give it the necessary strength and elasticity, the crook being of the ordinary curved form best adapted to enable it to spring open slightly to allow the leg of the animal to pass into the wider or outer portion, $b$, of the loop. Near the middle of the shank $c$ of the crook A is riveted or otherwise suitably secured at $d$ a short piece, $e$, of metal, of the same form in cross-section as that of which the crook is composed, the two portions or branches $c\ e$, when bent at a suitable angle, thus forming an open V-shaped socket, which, as the concave sides of the branches $c\ e$ are innermost, is adapted to fit, without further labor in shaping, the rounded and tapered end of the long wooden staff B, to which the crook is securely fastened by rivets or screws $f$, and in this manner a strong socket or fastening device is formed at a trifling cost. By thus constructing the crook of metal having the shape in cross-section above referred to its weight is reduced to less than one-third of that of a crook as heretofore made, without in the least impairing its strength, and consequently the implement can be conveniently and quickly handled without tiring the arm of the shepherd to that extent which occurs where the ordinary solid heavy crook at the end of the staff is employed.

Although I prefer to employ tempered spring-steel in the manufacture of the above-described crook, any other suitable metal possessing the required stiffness, strength, and elasticity may be used instead, if desired.

What I claim as my invention, and desire to secure by Letters Patent, is—

A shepherd's crook composed of tempered spring-steel or other suitable metal of concavo-convex or V shape in cross-section, and provided at its lower end with an open V-shaped socket for attachment to the staff or handle, formed by securing to the shank of the hook, at a suitable angle, a piece, $e$, of metal, of the same form in cross-section as that of which the hook is composed, and having the concave sides of the two branches $c\ e$ innermost, substantially as and for the purpose described.

Witness my hand this 13th day of March, A. D. 1883.

CHARLES H. DANA.

In presence of—
J. M. PINGRE,
WILLIAM W. DANA.